(12) United States Patent
Watanabe et al.

(10) Patent No.: US 6,188,197 B1
(45) Date of Patent: Feb. 13, 2001

(54) LIGHT CHARGING TYPE SECONDARY BATTERY UNIT HAVING A PHOTO-ELECTRIC TRANSDUCER BEING WOUND ON A WINDING CORE AND ELECTRICAL EQUIPMENT

(75) Inventors: Haruo Watanabe, Kanagawa; Tomikazu Watanabe, Tokyo; Koichiro Hinokuma; Ritsuko Inoue, both of Kanagawa, all of (JP)

(73) Assignee: Sony Corporation, Tokyo (JP)

( * ) Notice: Under 35 U.S.C. 154(b), the term of this patent shall be extended for 0 days.

(21) Appl. No.: 09/392,558

(22) Filed: Sep. 9, 1999

(30) Foreign Application Priority Data

Sep. 16, 1998 (JP) .................................. 10-261998
Dec. 10, 1998 (JP) .................................. 10-351505

(51) Int. Cl.⁷ .................................. H01M 10/46
(52) U.S. Cl. .................................. 320/101; 320/107
(58) Field of Search .................................. 320/101, 107, 320/112, FOR 102, FOR 160; 136/243, 244, 245, 252, 259, 292

(56) References Cited

U.S. PATENT DOCUMENTS 4,782,432  11/1988  Coffman .

5,500,055 * 3/1996  Toyama et al. .................................. 136/259

FOREIGN PATENT DOCUMENTS 0 332 004 A2   9/1989  (EP) .
0 554 877 A1   8/1993  (EP) .

OTHER PUBLICATIONS

Patent Abstracts of Japan, vol. 013, No. 160 (E–744) Apr. 18, 1989 & JP63–314780A (Kyushu Hitachi Maxell Ltd.) Dec. 22, 1988.

Patent Abstracts of Japan, vol. 012, No. 250 (E–633), Jul. 14, 1988 & JP63–037575A (Shimadzu Corp.) Feb. 18, 1988.

* cited by examiner

*Primary Examiner*—Edward H. Tso
(74) *Attorney, Agent, or Firm*—Sonnenschein, Nath & Rosenthal

(57) ABSTRACT

Light energy is to be utilized as the power source for a customary electrical equipment. A flexible photo-electric transducer 3 is arranged so as to be wound about a cylindrically-shaped winding core 2. When charging the storage battery 4, housed on the winding core 2, the photo-electric transducer 3 wound about the winding core 2 is pulled out to receive the light.

12 Claims, 18 Drawing Sheets

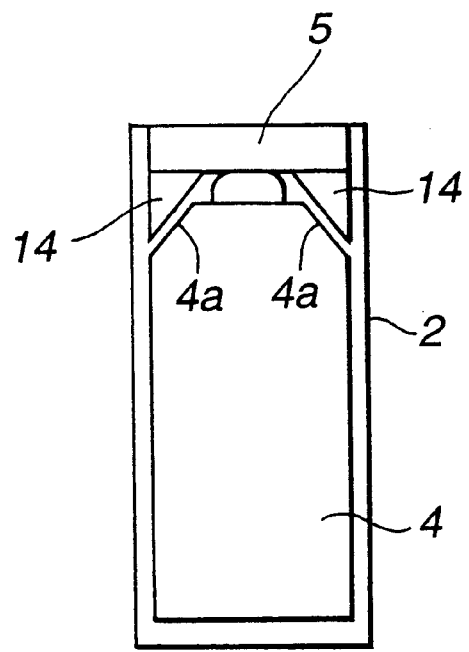
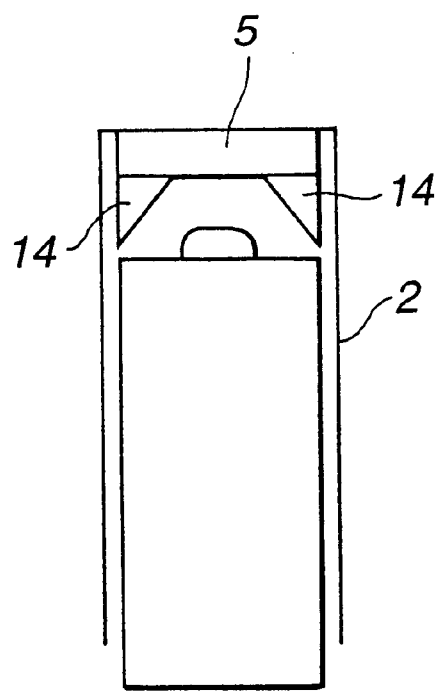
FIG.17A  FIG.17B

LIGHT CHARGING TYPE SECONDARY BATTERY UNIT HAVING A PHOTO-ELECTRIC TRANSDUCER BEING WOUND ON A WINDING CORE AND ELECTRICAL EQUIPMENT

RELATED APPLICATION DATA

The present application claims priority to Japanese Application No. P10-261998 filed Sep. 16, 1998 and Japanese Application P10-351505 filed Dec. 10, 1998, which applications are incorportated herein by reference to the extent permitted by law.

BACKGROUND OF THE INVENTION

1. Field of the Invention

This invention relates to a light charging type secondary battery unit in which a photo-electric transducer and a storage battery are unified together. This invention also relates to an electrical equipment having both a photo-electric transducer and a storage battery unit.

2. Description of the Related Art

The photo-electric transducer, also termed a solar cell, is a device for converting light energy, such as that from the sunbeams, into an electrical energy. In distinction from a fossil fuel, utilized up to now, the photo-electric transducer scarcely emits an exhaust gas, such as carbon dioxide, when recovering the electric energy from the light energy. Also, since the photo-electric transducer recovers the electric energy from the light energy of a sunbeam, which is felt to be limitless, power generation can be assured semi-permanently. For this reason, the photo-electric transducer presumably finds an increasing field and scope of application in view of the incumbent problem of the global environment.

However, the photo-electric transducer frequently undergoes temporal fluctuations in the amount of the light energy from the sunbeams, such that the electric energy recovered by conversion from the light energy also undergoes temporal fluctuations, with the result that the photo-electric transducer can frequently not be usable as a direct power source for electric equipments.

Also, since the light energy such as that from the sunbeams is present in a spatially rarefied state, the photo-electric transducer is in need of a large light reception area in order to acquire the power of a pre-set quantity suitable for utilization.

Thus, the photo-electric transducer is used as an auxiliary power source for electric equipment or in a field in which the generated electric energy is transiently stored in a storage battery and used as the power discharged from the storage battery.

On the other hand, electrical equipment is progressively reduced in size with the recent progress in various processing techniques and frequently used as portable equipment. For this reason, the usual power source for the electrical equipment is a dry cell which is convenient for its portability, and hence there is possibility of an increasing demand for dry cells in the future.

However, the dry cell is usually a primary cell, such as a manganese dry cell or an alkali manganese dry cell, and is discarded after discharging its stored energy. Thus, dry cells cannot be said to be desirable because of economic considerations, wastage of natural resources and load imposed on the environment. Although a secondary battery having the standard shape similar to that of the dry cell, such as a NiMH cell, is in use, it cannot be said to be optimum, as the primary battery, if the battery is charged by means which possibly imposes loads on the global environment.

There has also been proposed in, for example, Japanese Laid-Open Patent S-63-314780 entitled "Battery" or in Japanese Laid-Open Patent H-2-73675 entitled "Cylindrically-Shaped Charging Type Solar Cell", a light charging type secondary battery unit which combines the above-described merit of the photo-electric transducer and the ease in handling proper to the dry cell. The conventional light charging type secondary battery unit, combining the photo-electric transducer as a power generating portion and the storage battery as a charging/discharging portion, realizes the driving of an ordinarily used electrical equipment by the power generated by the light energy.

However, with the conventional light charging type secondary battery unit since the photo-electric transducer receives the light energy of sunbeams, which illuminate from a pre-set direction, it is difficult to utilize the totality for the outer surface of the storage battery. Moreover, it is not possible with the conventional light charging type secondary battery unit to have a light receiving area of the photo-electric transducer which is in excess of the outer surface of the storage battery. Therefore, the conventional light charging type secondary battery unit has a drawback that the battery charging time is unbearably long, while the photo-electric transducer cannot develop the power required for charging the storage cell.

SUMMARY OF THE INVENTION

It is therefore an object of the present invention to provide a light charging type secondary battery which, by combining a resilient photo-electric transducer and a storage cell, can use light energy, such as that from sunbeams, as a power source for usually employed electrical equipment, and has practically usable charging/discharging performance.

It is another object of the present invention to provide an electrical equipment having a storage cell that can be charged and discharged and a flexible photo-electric transducer and which is endowed with a practically sufficient power generating performance in charging the storage cell by the photo-electric transducer.

In one aspect, the present invention provides a light charging type secondary battery unit including a cylindrically-shaped winding core, and a flexible photo-electric transducer placed around the winding core so that the photo-electric transducer can be pulled out therefrom. The winding core includes a secondary battery that can be charged and discharged, and a control circuit for controlling the charging and discharging of the secondary battery. The photo-electric transducer is wound on the winding core to present a substantially cylindrical overall shape.

In the above-defined light charging type secondary battery unit, the photo-electric transducer wound about the winding core is pulled out to receive light for charging the secondary battery to realize apractically sufficient charging performance. For discharging, the photo-electric transducer is wound on the winding core so that the overall structure presents a substantially cylindrical shape to facilitate the use of the secondary battery as a power source for an ordinary electrical equipment.

In another aspect, the present invention provides an electrical equipment including a secondary battery that can be charged and discharged and a flexible photo-electric transducer. The photo-electric transducer is housed in the inner space of the electrical equipment in the wound or collapsed state. The secondary battery is charged in the state it is extracted from the electrical equipment.

In the above-described electrical equipment, the photo-electric transducer housed in the inner space in the electrical equipment in the wound or collapsed state is pulled out to receive the light for charging the secondary battery to realize the practically sufficient charging performance.

Thus, in the light charging type secondary battery unit according to the present invention, the photo-electric transducer wound on the winding core is pulled out to receive the light for charging. When the photo-electric transducer has been taken up on the winding core for discharging of the secondary battery, the entire unit presents a substantially cylindrical shape to assure facilitated utilization of the unit as a power source of the commonplace electrical equipment as well as manifestation of the high charging performance sufficient for practical utilization. Thus, with the present light charging type secondary battery unit, the light energy of, for example, the sunlight can be used as a power source for the electrical equipment to realize effective utilization of natural resources as well as to prevent production of waste materials.

Also, with the electrical equipment according to the present invention, provided with a secondary battery that can be charged and discharged, and a flexible photo-electric transducer, which is housed in the wound or collapsed state, the photo-electric transducer can be efficiently accommodated even if the photo-electric transducer is increased in its light receiving area. Thus, the electrical equipment can be provided with the photo-electric transducer having a large light receiving area so that the photo-electric transducer used for charging the secondary battery will have a practically sufficient power generating performance.

BRIEF DESCRIPTION OF THE DRAWINGS

FIGS. 17A & B are schematic views for illustrating the operation of a cell controlling projection of the secondary battery unit.

DESCRIPTION OF THE PREFERRED EMBODIMENTS

Figure 1:
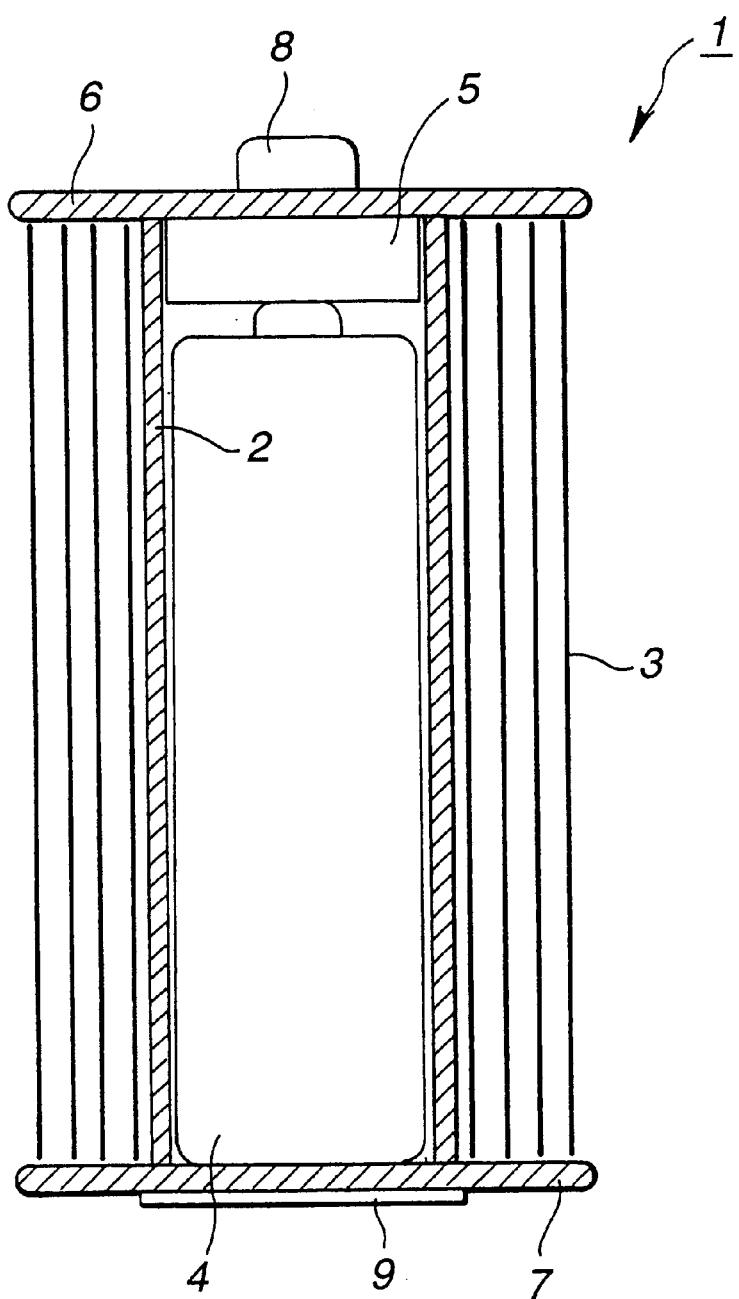
FIG. 1 is a schematic cross-sectional view of a light charging type secondary battery unit according to the present invention.

Referring to the drawings, preferred embodiments of the present invention will be explained in detail. First, a light charging type secondary battery unit 1, shown in FIG. 1, is explained.

The light charging type secondary battery unit 1 includes a cassette library winding core 2, a flexible photo-electric transducer 3 wound about the winding core 2 so as to be pulled out therefrom, and a storage cell 4 and a control circuit 5 provided within the winding core 2. The light charging type secondary battery unit 1 is substantially cylindrical in shape with the photo-electric transducer 3 placed around the winding core 2.

The winding core 2 is cylindrical in shape and is formed of a resin material, such as ABS resin. The winding core 2, on which is wound the photo-electric transducer 3, is of a length slightly larger than the width of the photo-electric transducer 3. Thus, the winding core 2 can take up the photo-electric transducer 3 over its entire width, so that there is no risk of the photo-electric transducer 3 extending beyond the length of the winding core 2. The winding core 2 is also provided with an upper flange 6 and a lower flange 7.

The upper flange 6 and the lower flange 7 are formed of a resin material, such as ABS resin, to a substantially flat plate shape, and are secured to both ends of the winding core 2 by securing means, such as an adhesive. The upper and lower flanges 6, 7 are of a diameter substantially equal to the diameter of the photo-electric transducer 3 placed around the winding core 2. The upper and lower flanges 6, 7 thus serve for protecting the lateral edges of the photo-electric transducer 3 placed around the winding core 2 and as guides in taking up the pulled-out photo-electric transducer 3 on the winding core 2 to enable the photo-electric transducer 3 to be taken up on the winding core 2 without positional shift.

The winding core 2, upper flange 6 and the lower flange 7 are preferably formed of a material having superior heat-insulating properties. It is possible for the light charging type secondary battery unit 1 in this case to prevent the internal wiring from shorting via these flanges as well as to prevent the flanges from coming into contact with terminals of a battery housing section of the electrical equipment at the time of electric discharging to prevent the flanges from shorting.

The winding core 2, upper flange 6 and the lower flange 7 are preferably formed of a material exhibiting superior heat insulating properties. This prevents the light charging type secondary battery unit 1 from being destroyed due to increased temperature of the internally housed storage battery 4 due to inadvertent exposure to elevated temperatures caused by being left on a dashboard of the storage battery 4.

The winding core 2, upper flange 6 and the lower flange 7 are preferably colored to a tint less liable to absorb light, for example, white tint, or heat. This prevents the light charging type secondary battery unit 1 from being destroyed by the increasing temperature of the internally housed storage battery 4.

The upper flange 6 and the lower flange 7 are provided with a positive terminal 8 and a negative terminal 9, respectively. The positive terminal 8 and the negative terminal 9 are formed of an electrically conductive material and electrically connected to pre-set portions of the control circuit 5 by wiring means, not shown, as will be explained subsequently.

The photo-electric transducer 3 is a flexible photo-electric transducer arranged in a subsequently rectangular sheet, that is a so-called solar cell. Specifically, the photo-electric transducer 3 is a flexible thin film formed by sequentially layering a reflective electrode layer having metal electrodes mainly composed of Ag, Al, Cr, Ni, Cu or C, a photo-electric transducing layer formed by a thin film of an amorphous semiconductor, exemplified by an a—Si pn junction structure, and a transparent electrode layer mainly composed of ZnO, $SnO_2$ or $In_2O_3$, on an insulating film, such as a polyester film. Each layer of the photo-electric transducer 3 is formed as a thin film by a PVD method, exemplified by the sputtering method or the evaporation method, or a CVD method exemplified by the plasma CVD method or the MOCVD method. The photo-electric transducer 3 may also be of a pn junction structure by being formed of a p-type organic semiconductor and a n-type semiconductor such as copper phthalocyanine.

The photo-electric transducer 3 is placed around the winding core 2 so as to be pulled out therefrom and has its innermost rim side secured to the winding core 2. This innermost rim side of the photo-electric transducer 3 is provided with a positive terminal and a negative terminal, not shown, electrically connected to pre-set portions of the control circuit 5 by wiring means, not shown, as will be explained subsequently.

The photo-electric transducer 3 is placed around the winding core 2 so that its light receiving surface will face the inside. This prevents the light charging type secondary battery unit 1 used for discharging from being destroyed due to the light receiving surface of the photo-electric transducer 3 being exposed, on an outside, damage.

In the preferred embodiment, the light receiving surface of the photo-electric transducer 3 faces the inner side when the photo-electric transducer 3 is placed on the winding core 2. The present invention is, however, not limited to this particular configuration. For example, the light receiving surface of the photo-electric transducer 3 faces the outer side when the photo-electric transducer 3 is placed on the winding core 2. Thus, with the light charging type secondary battery unit 1, the storage battery 4 can be charged even if the photo-electric transducer 3 is not pulled out and remains wound on the winding core 2.

The storage battery 4, housed within the internal spacing of the winding core 2, is a chargeable/dischargeable secondary battery. Specifically, the storage battery 4 may, for example, be a nickel-hydrogen secondary battery, a nickel-cadmium secondary battery, a nickel-zinc secondary battery, zinc-silver oxide secondary battery or an iron-nickel secondary battery.

The storage battery 4 is preferably a nickel-hydrogen secondary battery. This enables the storage battery 4 to be increased in energy density per unit volume to assure superior adaptability to environments without employing heavy metals, such as lead or cadmium.

The storage battery 4 may be a standardized secondary battery having a pre-set standard battery shape. Specifically, the storage battery 4 may be an R-6 type cell, termed a tan-3 cell, an R03 type cell, termed a tan-4 cell, an R-1 type cell, termed a tan-5 cell, or an R44 or R1220 type cell, termed a button cell, prescribed in IEC or JIS. This assures suppression of costs in development and manufacture in the light charging type secondary battery unit 1.

In light of the storage capacity, a storage battery constituting material, such as an electrolytic solution, is preferably housed in the internal space of the winding core 2 without employing the standard secondary battery. This enables the storage cell constituting material to be sealed in a spacing corresponding to the exterior portion of the standard secondary battery to increase the storage capacity.

The storage battery 4 can be configured to be mounted on or dismantled from the winding core 2. Specifically, the lower flange 7 may be adapted to be opened or closed so that the storage battery 4 can be inserted onto or detached from the winding core 2 via this opening portion. Alternatively, part of the winding core 2, exposed to the outside in the extended state of the photo-electric transducer 3, may be opened or closed so that the storage battery 4 can be inserted onto or detached from the winding core 2 via this opening portion.

In this case, exclusively the storage battery 4 can be exchanged even if the storage battery 4 is used up due to repeated charging/discharging. Thus, it is unnecessary with the light charging type secondary battery unit 1 to discard, along with the used-up storage battery 4, the components of the light charging type secondary battery unit 1 other than the used-up storage battery 4 having a service life longer than that of the storage battery 4, thus contributing to more effective utilization of natural resources.

Also, the light charging type secondary battery unit 1 can be used in this manner as a charger for charging the storage battery 4. That is, the storage battery 4 can be charged by the light charging type secondary battery unit 1, and the storage battery 4, thus charged to its full capacity, can be taken from the light charging type secondary battery unit 1, to exploit the storage battery 4 as a power source for an electronic equipment.

The storage battery 4 may also be a standard secondary battery, as described above, and may be configured to be mounted on or dismantled from the winding core 2. By using a standard secondary battery as the storage battery 4, with the standard secondary battery being detachable, in this manner, it is possible with the light charging type secondary battery unit 1 to perform this exchange operation easily and simply at the time of exchanging the storage battery 4, as described above. Also, in this case, the light charging type secondary battery unit 1 can be used as a charger for charging the storage battery 4, as described above. By so doing, the storage battery 4, having the shape of a standard secondary battery, can be mounted on or dismantled from the light charging type secondary battery unit 1 so that the storage battery 4 can be used with electrical equipment having the usual tubular standard cells as a power source.

The discharging capacity of the storage battery 4 is preferably 0.6 to 1.9 V. In this case, it is possible to prevent the light charging type secondary battery unit 1 from failing to operate the electrical equipment due to the discharging voltage of the storage battery 4 falling short of the operating voltage of the electrical equipment when the light charging type secondary battery unit 1 is used for an electrical equipment employing the usual tubular standard battery as the power source. In addition, it is possible to prevent the light charging type secondary battery unit 1 from destroying the electrical equipment due to the discharge voltage of the storage battery 4 exceeding the allowable voltage for the electrical equipment.

The control circuit 5 is housed within the internal spacing of the winding core 2. The control circuit 5 has the function of rectifying the photo-electric transducer 3 and the storage battery 4, the function of preventing overcharging of the storage battery 4 by the photo-electric transducer 3, the function of preventing overdischarging of the storage battery 4 and the function of controlling the charging/discharging state of plural secondary batteries used in an embodiment which will be explained subsequently. In the following, an illustrative structure of the control circuit 5 is shown. It is noted that the control circuit 5 is not limited to the following typical structure provided that the control circuit 5 used has the above-defined functions.

Figure 2:
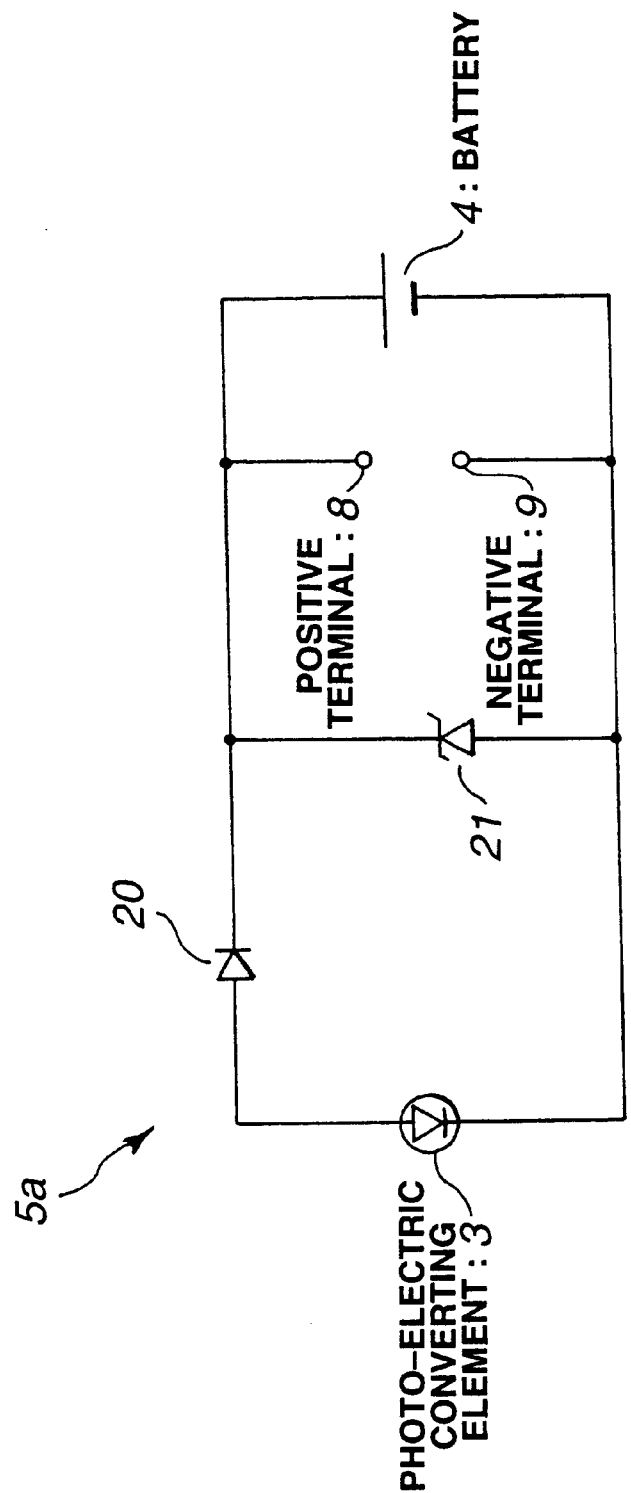
FIG. 2 is a circuit diagram having a control circuit for a first embodiment of the secondary battery unit.

Specifically, the control circuit 5 may be constructed by a circuitry (first control circuit 5a) shown for example in FIG. 2. This first control circuit 5a has, among the above-mentioned respective functions, the rectifying function and the overcharging preventative function.

The first control circuit 5a has a diode 20, having the rectifying function for the photo-electric transducer 3 and the storage battery 4, and a Zener diode 21 for preventing overcharging of the storage battery 4 by the photo-electric transducer 3.

In the first control circuit 5a, the plus terminal of the photo-electric transducer 3 is connected to the anode of the diode 20, the cathode of which is connected to the cathode of the Zener diode, positive terminal 8 and to the positive terminal of the storage battery 4. Also, in the first control circuit 5a, the minus terminal of the photo-electric transducer 3 is connected to the anode of the Zener diode 21, negative terminal 9 and to the negative terminal of the storage battery 4.

Thus, the first control circuit 5a is constructed so that the diode 20 will prevent current reversal from the storage battery 4 to the photo-electric transducer 3. The first control circuit 5a is also constructed to prevent overcharging of the storage battery 4 by the voltage across the storage battery 4 being limited by the Zener diode 21 to a pre-set value.

Figure 3:
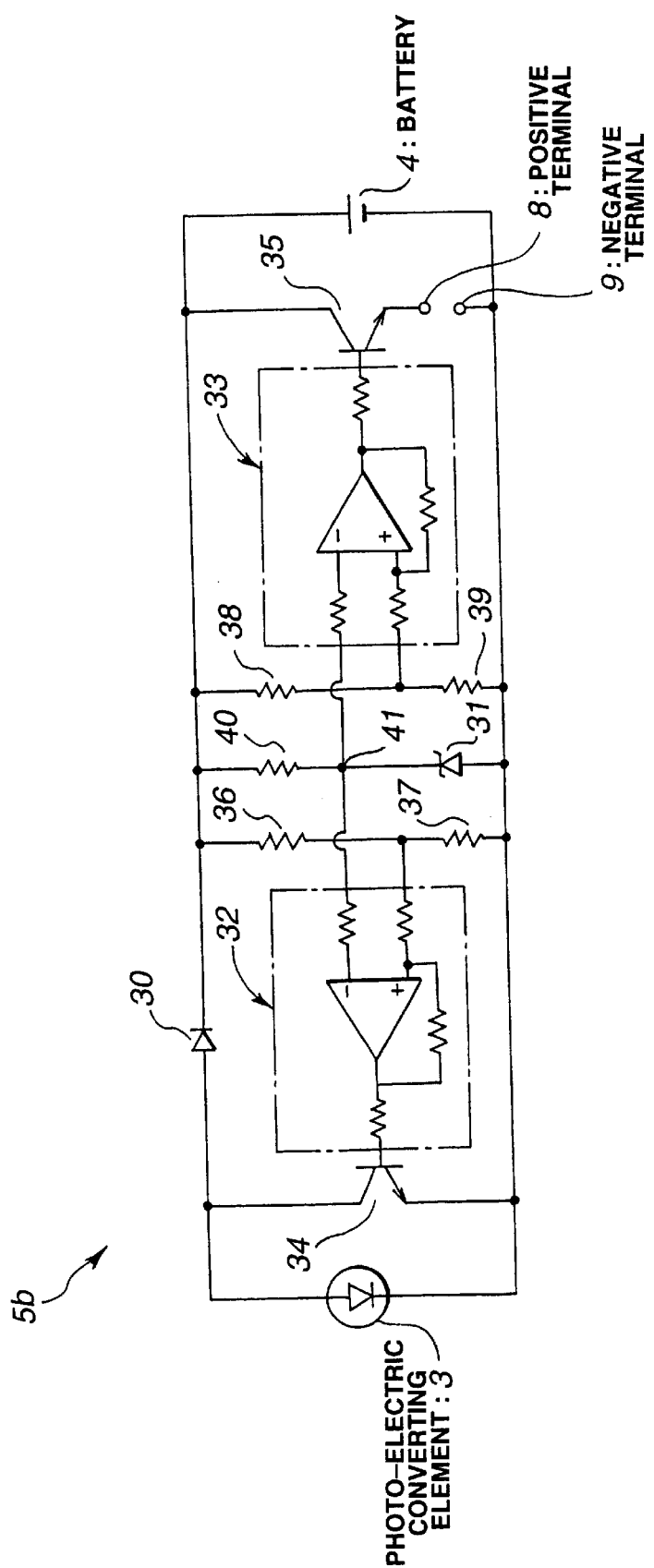
FIG. 3 is a circuit diagram having a control circuit for a second embodiment of the secondary battery unit.

The control circuit 5 may also be constructed by a circuitry (second control circuit 5b) shown for example in FIG. 3. This second control circuit 5b is such a circuit having, among the above-mentioned functions, the rectifying, overcharging preventative and overdischarging preventative functions.

Referring to FIG. 3, the second control circuit 5b includes a diode 30 having the rectifying function for the photo-electric transducer 3 and the storage battery 4, a Zener diode 31 for preventing overcharging to the storage battery 4 by the photo-electric transducer 3, a first comparison controller 32, a second comparison controller 33, a first switching element 34, a second switching element 35, resistors 36, 37 and 38, 39 for dividing the voltage at an output terminal of the photo-electric transducer 3, and a resistor 40 for absorbing the voltage drop by the Zener diode 31.

In this second control circuit 5b, the first comparison controller 32 and the second comparison controller 33 are each made up of an operational amplifier and resistors. The first switching element 34 and the second switching element 35 are configured as, for example, transistors.

In the second control circuit 5b, the plus terminal of the photo-electric transducer 3 is connected to an anode of the diode 30, a cathode of which is connected to the positive terminal of the storage battery 4. Also, in this second control circuit 5b, the minus terminal of the photo-electric transducer 3 is connected to an anode of the Zener diode 31, negative terminal 9 and to the negative terminal of the storage battery 4. Also, in the second control circuit 5b, the cathode of the Zener diode 31 is connected at a contact 41 to the resistor 40, the other terminal of which is connected to the cathode of the diode 30. Due to the operation of the Zener diode 31, the voltage value at the contact 41 does not exceed a pre-set value.

Also, in the second control circuit 5b, the output voltage of the photo-electric transducer 3, divided by the resistors 36, 37, is inputted to an input terminal of the first comparison controller 32, the other input terminal of which is connected to the contact 41. The comparison controller 32 compares the voltages to these input terminals to each other to control the first switching element 34. The first switching element 34 operates as a switch for shorting the plus and minus terminals of the photo-electric transducer 3.

In the second control circuit 5b, the output voltage of the photo-electric transducer 3, divided by the resistors 38, 39, is inputted to an input terminal of the second comparison controller 33, the other input terminal of which is connected to the contact 41. The comparison controller 32 compares the voltages to these input terminals to each other to control the second switching element 35. The second switching element 35 operates as a switch for shorting the plus terminal of the storage battery 4 and the positive terminal of the storage battery 4.

The second control circuit 5b is configured for preventing current reversal from the storage battery 4 to the photo-electric transducer 3.

If, in the second control circuit 5b, the voltage value across both terminals of the storage battery 4 reaches a pre-set value, the first comparison controller 32 controls the first switching element 34 to short the plus and minus terminals of the photo-electric transducer 3. Thus, the second control circuit 5b prevents overcharging of the storage battery 4.

Also, if the voltage value across both terminals of the storage battery 4 in the second control circuit 5b reaches a pre-set value, the second comparison controller 33 controls the second switching element 35 to interrupt connection between the storage battery 4 and the positive terminal 8.

Thus, in the second control circuit 5b, it is possible to prevent over-discharging of the storage battery 4.

Figure 4:
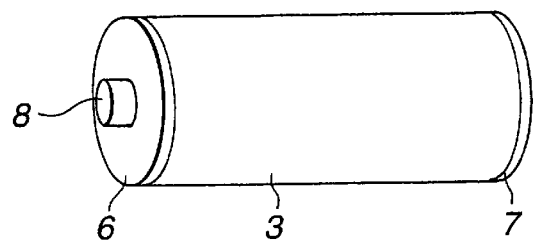
FIG. 4 is a perspective view showing the wound state of a photo-electric transducer of the secondary battery unit.

The light charging type secondary battery unit 1, constructed as described above, presents a substantially cylindrical overall shape, as shown in FIG. 4. The battery unit 1 is used in this condition for an electrical equipment so that it can be mounted or dismantled easily with respect to the electrical equipment.

In the light charging type secondary battery unit 1, the size of various portions is set so that the battery unit 1 will have a pre-set standard shape of a tubular battery in a state in which the photo-electric transducer 3 is wound about the winding core 2. Specifically, the light charging type secondary battery unit 1 may be a s-called R20 type cell, termed a tan-1 type, an R-14 type cell, termed a tan-2 type, or an R-6 type cell, termed a tan-3 type, as prescribed in IEC or in JIS.

This assures facilitated utilization of the light charging type secondary battery unit 1 in an electrical equipment designed to be driven by an internally housed tubular cell of an ordinary standard. Thus, in the present case, the light charging type secondary battery unit 1 is able to convert the light energy of, for example, sunbeams, into the electric energy, and to use the stored electric energy as the power source of the electrical equipment employing the customary tubular cell.

Figure 5:
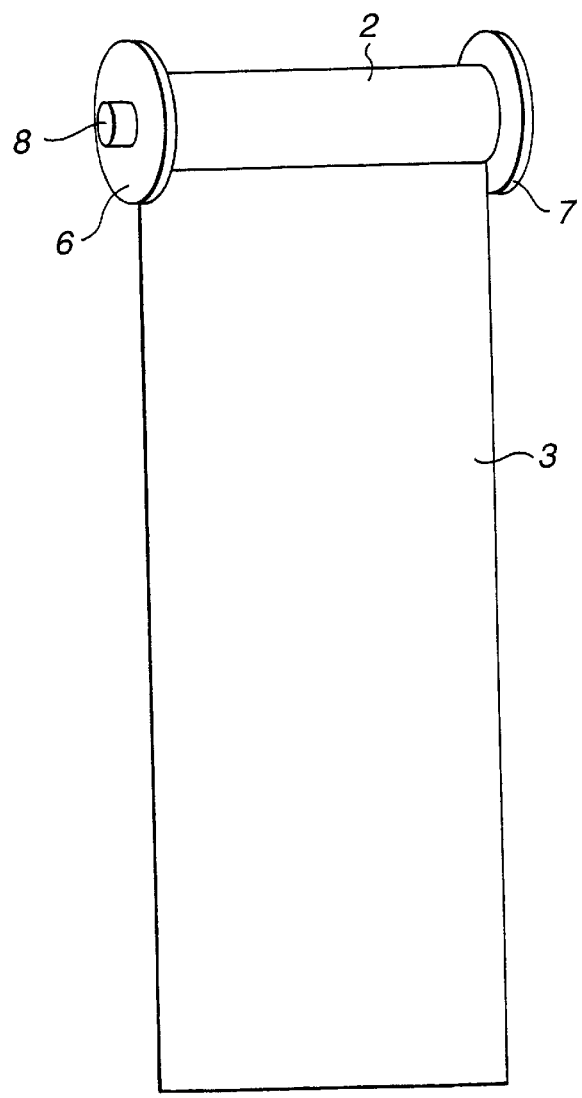
FIG. 5 is a perspective view showing the led-out state of a photo-electric transducer of the secondary battery unit.

Also, in the light charging type secondary battery unit 1, the storage battery 4 is charged in a state in which the photo-electric transducer 3 is pulled out from the winding core 2, as shown in FIG. 5. Since the light receiving area of the photo-electric transducer 3 of the light charging type secondary battery unit 1 can be enlarged, while the entire light receiving area of the photo-electric transducer 3 can be directed to the light direction, it is possible to increase the power generating potency of the photo-electric transducer 3 and hence to reduce the charging time at the time of charging the storage battery 4 to a practically sufficient level.

Meanwhile, the light charging type secondary battery according to the present invention is not limited to the shape, number or the mounting positions of the secondary battery or batteries, nor to the mounting position of the control circuit 5, it being only sufficient if the storage battery 4 and the control circuit 5 are provided within the winding core 2.

Figure 6:
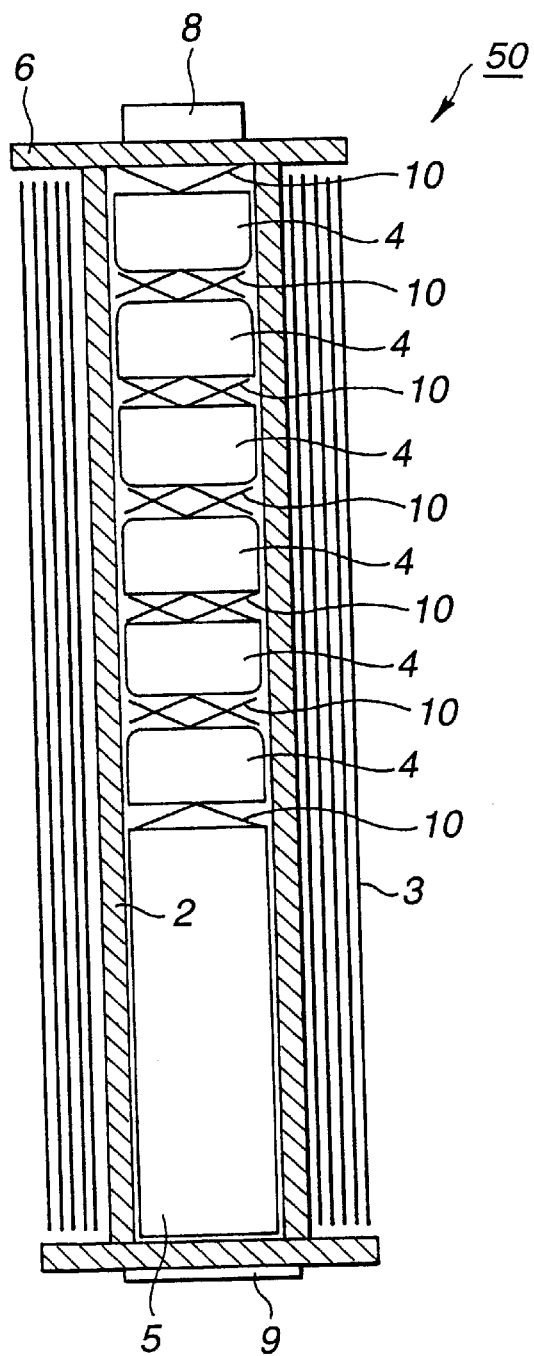
FIG. 6 is a schematic cross-sectional view of a light charging type secondary battery unit according to a modification of the present invention.

Thus, the light charging type secondary battery may be comprised of plural secondary batteries 4, as in the case of a light charging type secondary battery unit 50 shown in FIG. 6. In the light charging type secondary battery unit 50, the respective secondary batteries 4 are supported by elastic members, for example, coil springs or spring plates, in a manner free from position shifting.

Figure 7:
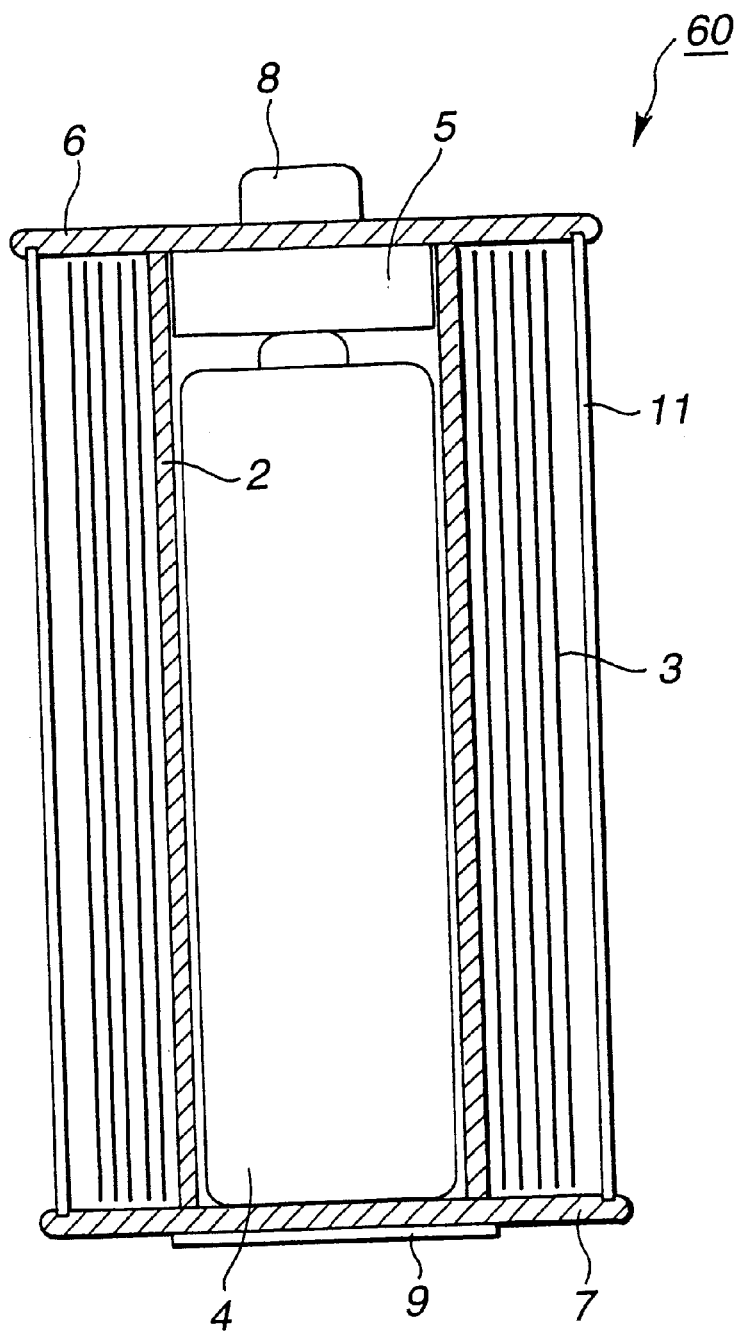
FIG. 7 is a schematic cross-sectional view of a light charging type secondary battery unit according to another modification of the present invention.
Figure 8:
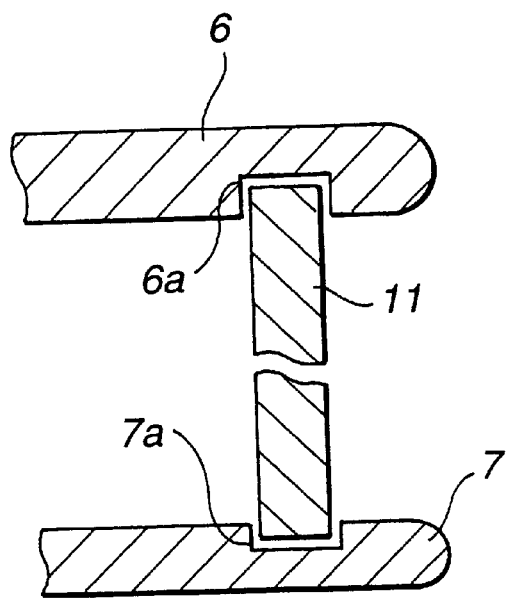
FIG. 8 is an enlarged cross-sectional view showing essential portions of the secondary battery unit shown in FIG. 7.

The light charging type secondary battery may also be configured to have an outer peripheral wall 11, as shown in FIG. 7. In the following, the light charging type secondary battery unit 60 having this outer peripheral wall 11 is explained. In the following description, the parts or components which are the same as or equivalent to those in the previous explanation are not explained and denoted by the same reference numerals.

Referring to FIG. 7, the light charging type secondary battery unit 60 includes a substantially cylindrical outer peripheral wall 11 of substantially the same diameter as the diameters of the upper flange 6 and the lower flange 7. In the light charging type secondary battery unit 60, the upper and lower flanges 6, 7 are provided respectively with grooves 6a, 7a in which are rotatably fitted lateral side edges of the outer peripheral wall 11. Thus, in the light charging type secondary battery unit 60, the outer peripheral wall 11 can be rotated freely with respect to the winding core 2, upper flange 6 and the lower flange 7.

In the outer peripheral wall 11 is formed a slit 11a, as shown in FIG. 9a. The slit 11a is of a width and a thickness sufficient to pull out the photo-electric transducer 3 therethrough and is formed in the outer peripheral wall 11.

Figure 9:
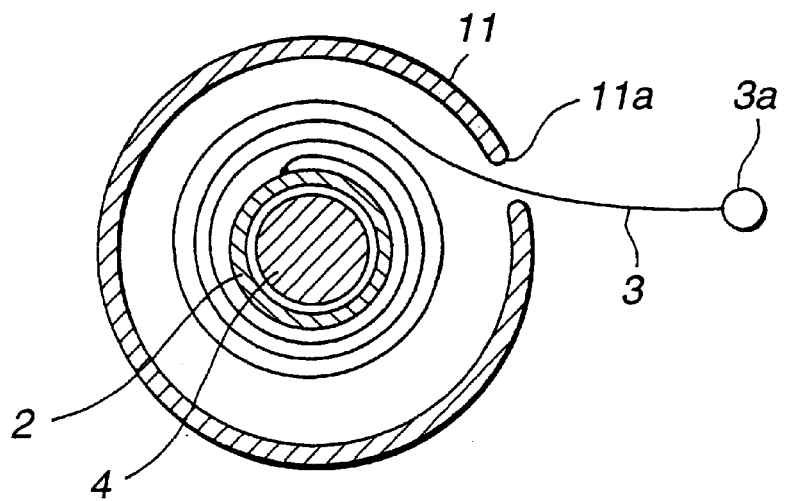
FIG. 9 is a horizontal cross-sectional view of the secondary battery unit shown in FIG. 7.

In the light charging type secondary battery unit 60, the outermost end of the photo-electric transducer 3 is formed with a retainer 3a, as shown in FIG. 9. This retainer 3a has a thickness sufficient to fit in the slit 11a when the photo-electric transducer 3 is wound about the winding core 2. The retainer 3a has the function of preventing the photo-electric transducer 3 from being wholly introduced into the inside of the outer peripheral wall 11, and the function of a handle by which to pull out the photo-electric transducer 3.

Figure 10:
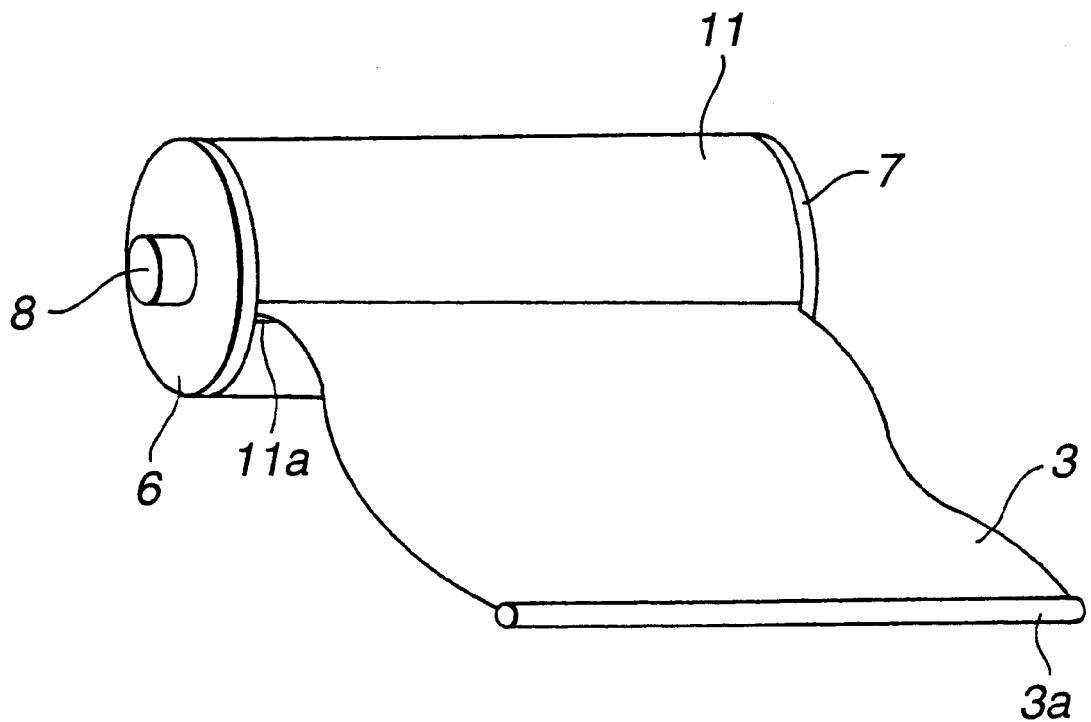
FIG. 10 is a perspective view showing an extended state of the photo-electric transducer of the secondary battery unit shown in FIG. 7.

In the light charging type secondary battery unit 60, the photo-electric transducer 3 is pulled out from the winding core 2 by the retainer being pulled out at the time of charging the storage battery 4, as shown in FIG. 10. Also, in the light charging type secondary battery unit 60, the photo-electric transducer 3 can be taken up on the winding core 2 by rotating the outer peripheral wall 11 with respect to the winding core 2.

Thus, in the light charging type secondary battery unit 60, the photo-electric transducer 3 can be pulled out or taken up easily by the rotatably mounted outer peripheral wall 11 having the slit 11a. In the light charging type secondary battery unit 60, having the outer peripheral wall 11, there is no risk of unwinding of the photo-electric transducer 3 when the battery unit is housed in an electrical equipment. Also, the light charging type secondary battery unit 60, having the outer peripheral wall 11, protects the photo-electric transducer 3 from outside to prevent damage to the photo-electric transducer 3 by the operation of the light charging type secondary battery unit 60 as well as to prevent heating of the secondary batteries 4 by direct sunbeams. For more reliably preventing heating of the secondary batteries 4, the outer peripheral wall 11 is desirably colored in a color tint less liable to absorb heat or light, such as white color tint.

Figure 11A:
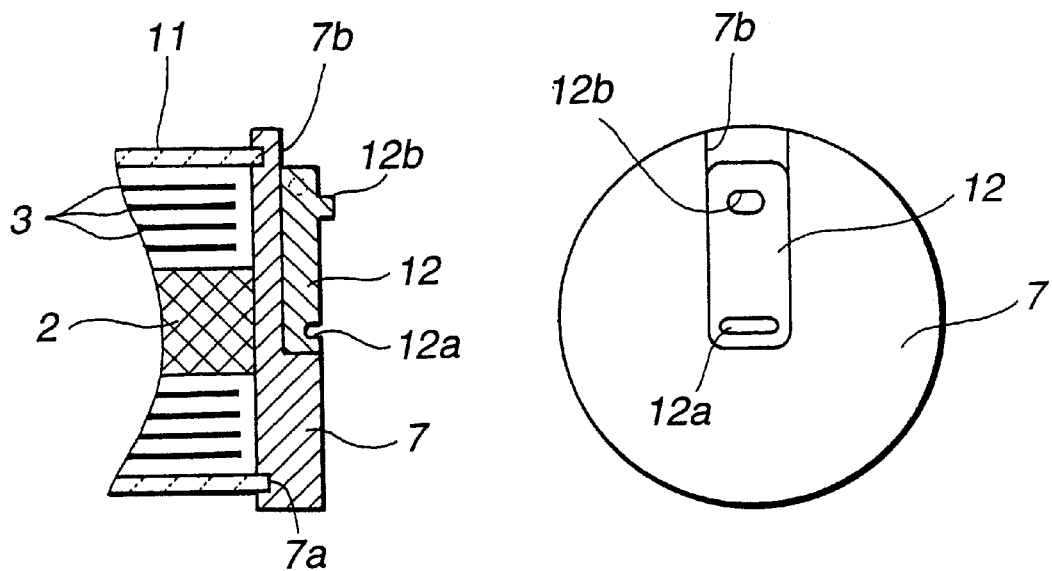
FIG. 11A is a cross-sectional side view and a bottom view of a rotary arm of the secondary battery unit shown in FIG. 7.
Figure 11B:
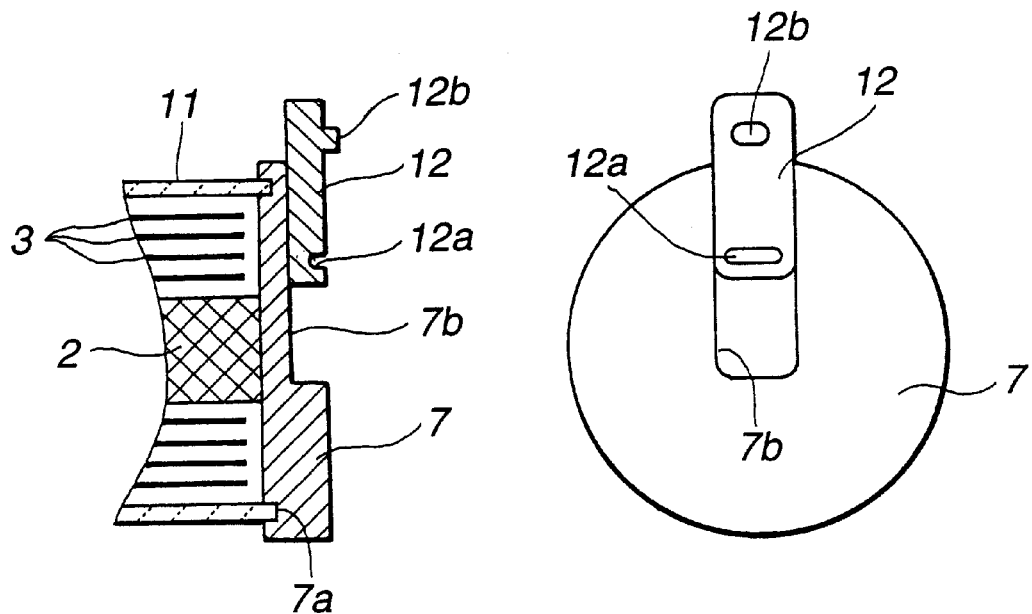
FIG. 11B is a cross-sectional side view and a bottom view showing the protruded state of the rotary arm of the secondary battery unit shown in FIG. 7.

The light charging type secondary battery unit 60 may also be provided with a rotary arm 12 for rotating the outer peripheral wall 11 with respect to the winding core 2. In this case, the light charging type secondary battery unit 60 is provided with a recess for an arm 7b extending from the vicinity of the center to a lateral side edge on the outer surface of the lower flange, as shown in FIGS. 11A and 11B. The rotary arm 12 is formed to a substantially rectangular planar shape and is of a thickness substantially equal to the depth of the recess for an arm 7b. The rotary arm 12 is formed with a slide recess 12a towards the center of the lower flange 7 in its major surface facing outwards. The lateral edge of the lower flange 7 is formed with a projection for rotation 12b.

The rotary arm 12 is housed within the recess for an arm 7b of the lower flange 7 so as not to be protruded from the outer rim of the lower flange 7, as shown in FIG. 11A. Also, when the outer peripheral wall 11 is rotated relative to the winding core 2 for taking up the photo-electric transducer 3, the rotary arm 12 is protruded from the outer rim of the lower flange 7, as shown in FIG. 11B.

In the light charging type secondary battery unit 60, the outer peripheral wall 11 is rotated relative to the winding core 2, by immobilizing the outer peripheral wall 11 and by rotating the projection for rotation 12b of the protruded rotary arm 12, in order to take up the photo-electric transducer 3 on the winding core 2. Stated differently, the light charging type secondary battery unit 60, having the rotary arm 12, can take up the photo-electric transducer 3 promptly and easily.

The rotary arm 12 is not limited to a structure in which it is slid and projected from the lower flange 7. For example, it may be rotated to be projected from the lower flange 7, as shown in FIGS. 12A and 12B.

In this case, the rotary arm 12 is provided with the projection for rotation 12b at the center of the lower flange 7, and a pair of projections 12c are provided on both lateral sides of the lateral edge of the lower flange 7. The paired projections 12c fit into paired recesses, not shown, provided in the lower flange 7, so as to be rotated therein.

Figure 12A:
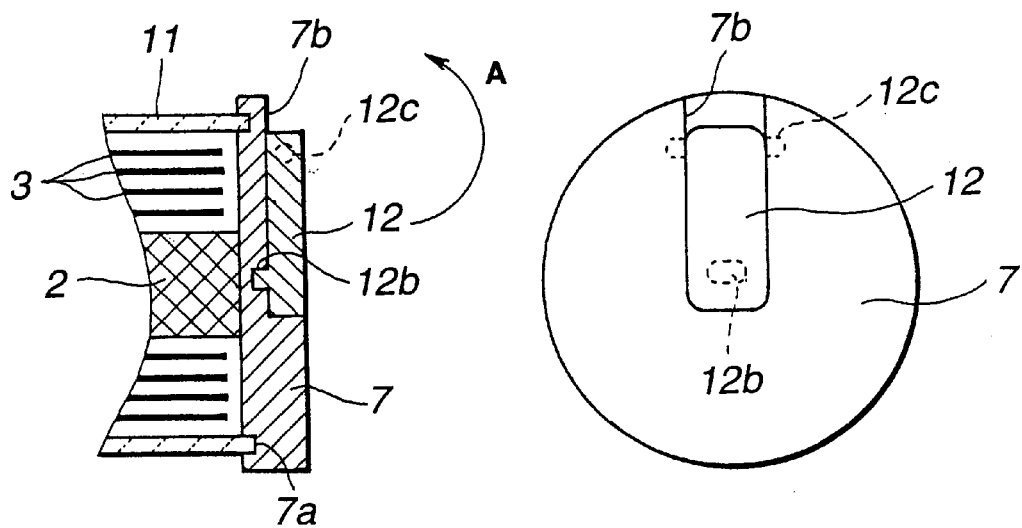
FIG. 12A is a cross-sectional side view and a bottom view showing the rotary arm of the secondary battery unit shown in FIG. 7.
Figure 12B:
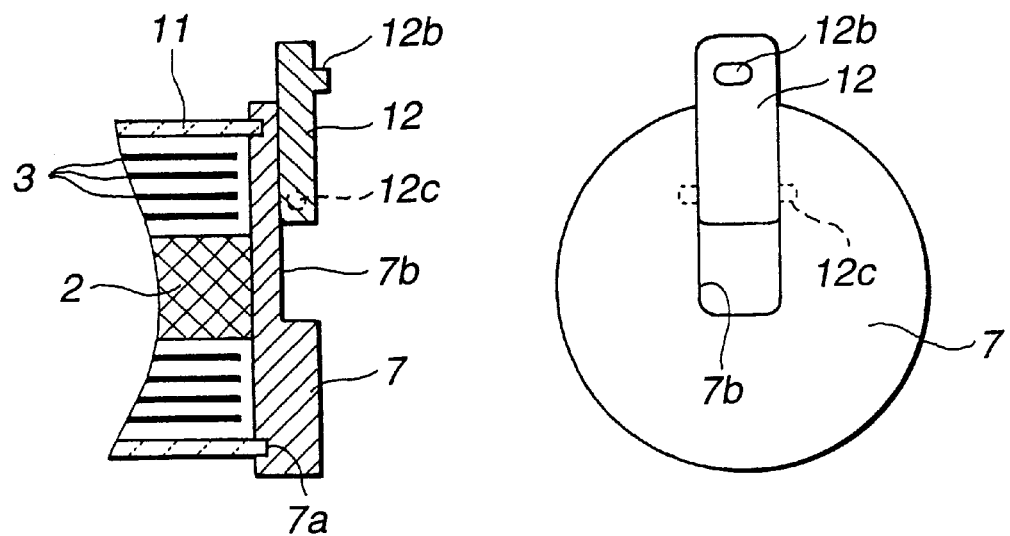
FIG. 12B is a cross-sectional side view and a bottom view showing the protruded state of the rotary arm of the secondary battery unit shown in FIG. 7.

The rotary arm 12 is housed in the recess for an arm 7b so as not to be projected from the outer rim of the lower flange 7, as shown in FIG. 12A. The rotary arm 12 is rotated as indicated by arrow A in FIG. 12B, about the paired projections 12c as center, so as to be projected from the outer rim of the lower flange 7.

In the foregoing description, the rotary arm 12 is provided on the lower flange 7. Alternatively, it may be provided on, for example, the upper flange 6.

Figure 13:
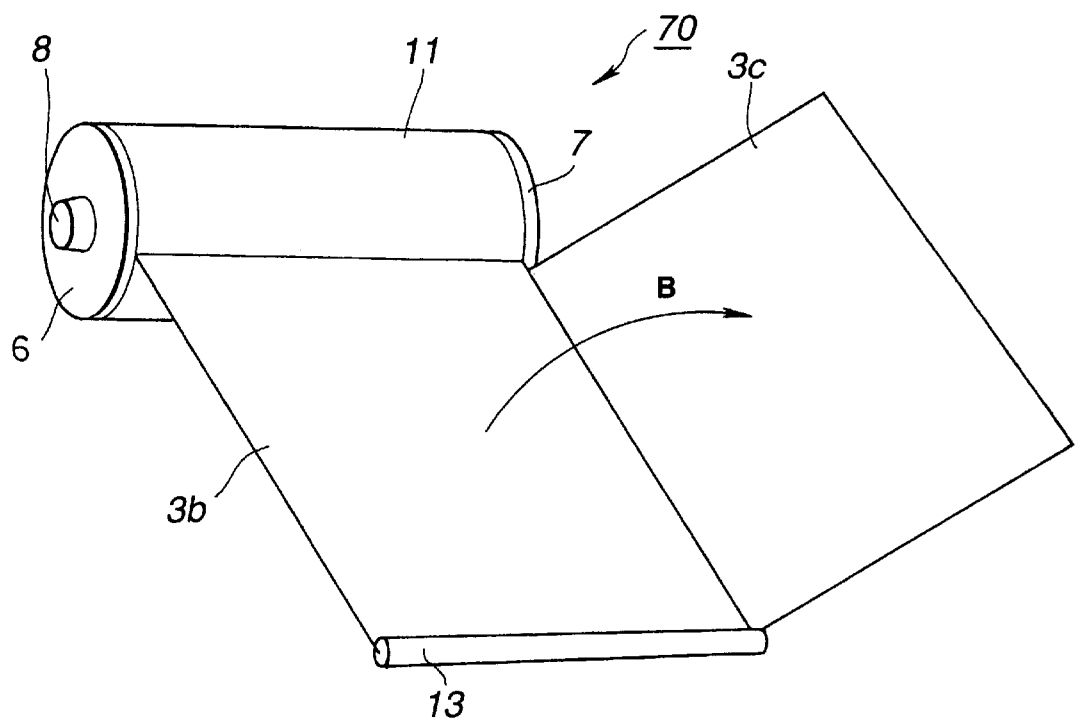
FIG. 13 is a perspective view showing a light charging type secondary battery unit having two photo-electric transducers according to the present invention.

The light charging type secondary battery unit according to the present invention may be provided with plural photo-electric transducers, as shown in FIG. 13. In the following, a light charging type secondary battery unit 70 having plural photo-electric transducers is explained. In the following description, the parts or components which are the same as or equivalent to those in the previous explanation are not explained and denoted by the same reference numerals.

The light charging type secondary battery unit 70 is provided with two photo-electric transducers 3b, 3c, as shown in FIG. 13. These two photo-electric transducers 3b, 3c are connected to each other in adjacent sides thereof so that these photo-electric transducers 3b, 3c are folded together in a direction substantially perpendicular to the direction in which these photo-electric transducers are pulled out from the winding core 2. In the light charging type secondary battery unit 70, these photo-electric transducers 3b, 3c are housed in a condition in which the photo-electric transducers 3b, 3c are folded together and taken up in this state on the winding core 2, with the photo-electric transducer 3c being spread out in the direction indicated by arrow B in FIG. 13 on being pulled out from the winding core 2.

With the light charging type secondary battery unit 70, since the light receiving area can be increased by the two photo-electric transducers 3b, 3c receiving the light in the spread-out state, it is possible to increase the power generating potency of the photo-electric transducer 3 and hence to reduce the charging time at the time of charging the storage battery 4 to a practically sufficient level.

Also, in the light charging type secondary battery unit 70, the photo-electric transducers 3b, 3c are folded in a facing position to each other and wound on the winding core 2 when housing the photo-electric transducers 3b, 3c. Therefore, when taken up on the winding core 2, the photo-electric transducers 3b, 3c are rounded with the respective light receiving surfaces being directed in the opposite directions. Thus, when the photo-electric transducers 3b, 3c are unfolded, the rounded states thereof cancel each other to prevent possible flexing.

Figure 14:
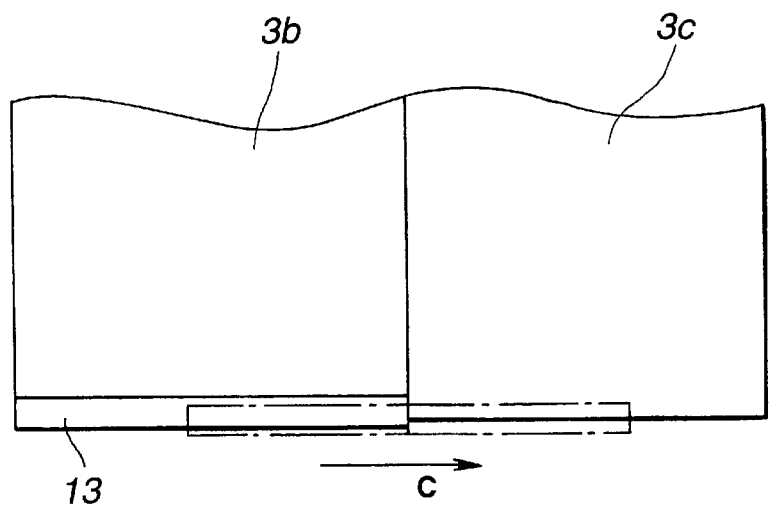
FIG. 14 is a plan view showing the operation of a retainer of the secondary battery unit shown in FIG. 7.

The light charging type secondary battery unit 70 may also be provided with a stop 13, in place of the retainer 3a of the light charging type secondary battery unit 60, as shown in FIGS. 13 and 14. The stop 13 has a sufficient thickness to engage in the slit 11a. The stop 13 is also provided with a slit extending in the longitudinal direction. The outer rim end of the photo-electric transducer 3b is engaged in and slid along this slit.

The stop 13 is slid up to the connecting portion of the photo-electric transducers 3b, 3c in the spread-apart state of the photo-electric transducers 3b, 3c, to immobilize the photo-electric transducers 3b, 3c in the spread-apart position.

Figure 15:
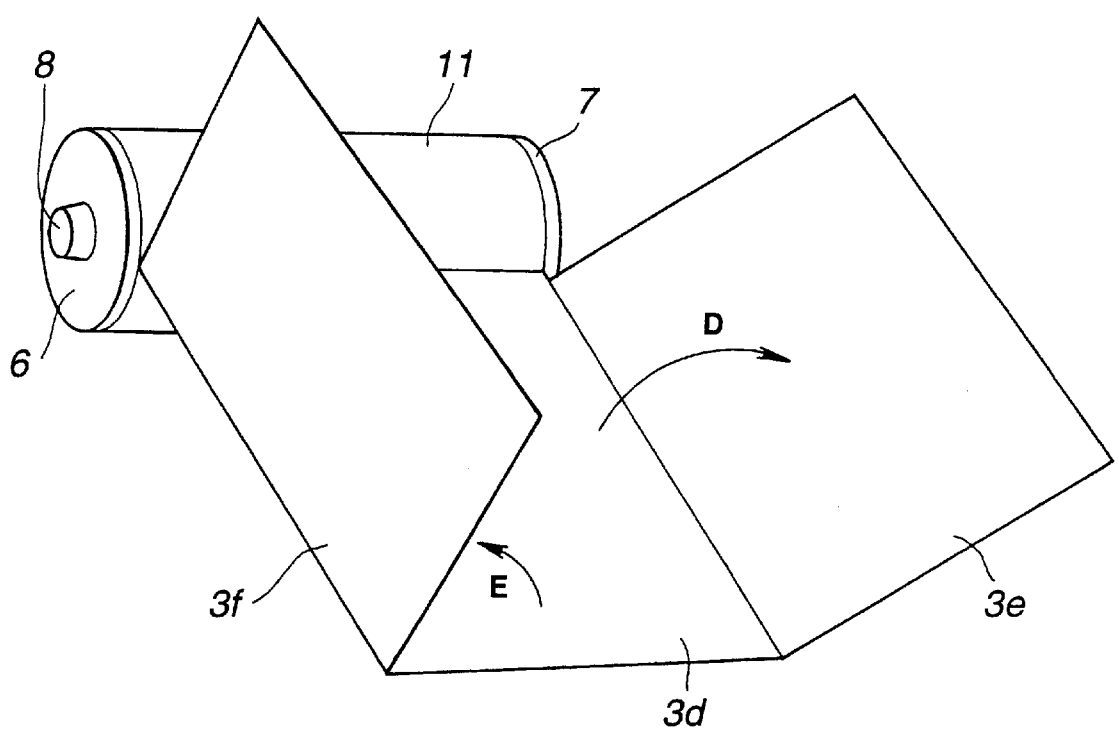
FIG. 15 is a perspective view showing a light charging type secondary battery unit having three photo-electric transducers according to the present invention.

The light charging type secondary battery unit 70 is not limited to the above-described structure comprised of two photo-electric transducers. For example, the light charging type secondary battery unit 70 may also be provided with three photo-electric transducers, as shown for example in FIG. 15. In this case, the light charging type secondary battery unit 70 includes three photo-electric transducers 3d, 3e and 3f, with the photo-electric transducers 3e and 3f being connected to both lateral sides of the photo-electric transducer 3d. The light charging type secondary battery unit 70 is wound on the winding core 2 in a state in which the photo-electric transducers 3e, 3f are folded on the photo-electric transducer 3d. The photo-electric transducers 3e and 3f are spread apart as indicated by arrows D, E in FIG. 15, in a state in which the photo-electric transducers 3e and 3f have been pulled out from the winding core 2.

By so doing, the light receiving area of the light charging type secondary battery unit 70 can be increased further to shorten the charging time of the storage battery 4 further.

Figure 16:
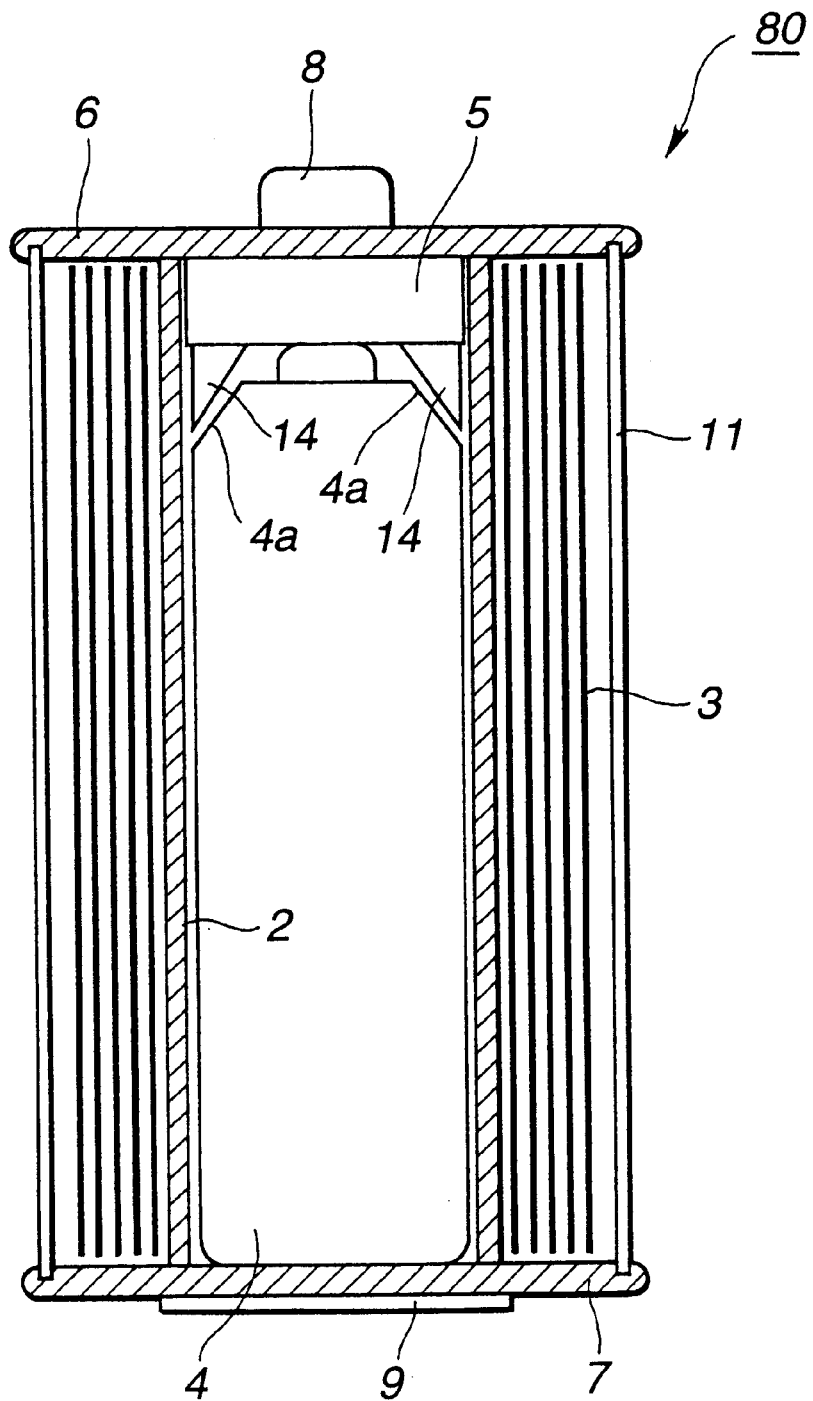
FIG. 16 is a schematic cross-sectional view showing a light charging type secondary battery unit having a cell controlling projection according to the present invention.

The light charging type secondary battery unit 70 may also be provided with a battery controlling protrusion 14, as shown in FIG. 16. In the following, a light charging type secondary battery unit 80 having the battery controlling protrusion 14 is explained. In the following description, the parts or components which are the same as or equivalent to those in the previous explanation are not explained and denoted by the same reference numerals.

The light charging type secondary battery unit 80 has the battery controlling protrusion 14 inwardly of the winding core 2, adapted for housing the storage battery 4, as shown in FIG. 16. In the light charging type secondary battery unit 80, the storage battery 4 can be mounted on or dismantled from the winding core 2, and is substantially of the same shape and size as the pre-set standard battery shape and size.

The battery controlling protrusion 14 is formed for being protruded towards the inner side of the winding core 2, such as by cutting out positive electrode side corners of the storage battery 4 housed within the winding core 2. The storage battery 4 also is formed with a cut-out 4a mating with the battery controlling protrusion 14. That is, the storage battery 4 is substantially of the same outer shape and size as the pre-set standard battery shape except the cut-out 4a formed at the positive electrode side corner.

Thus, with the light charging type secondary battery unit 80, the battery controlling protrusion 14 fits in the cut-out 4a of the storage battery 4 when the storage battery 4 is loaded on the winding core 2, as shown in FIG. 17a. However, if, in this light charging type secondary battery unit 80, it is attempted to load a standard battery of the standard battery shape and size on the winding core 2, as schematically shown in FIG. 17b, the battery controlling protrusion 14 is abutted against the positive electrode side corner of the standard battery to inhibit complete insertion of the standard battery onto the winding core 2.

With the light charging type secondary battery unit 80, provided with the battery controlling protrusion 14, it is possible to evade the risk of inadvertent loading on the winding core 2 and charging of the primary battery, charging of which is not desirable, that is manganese dry cells or alkali manganese dry cells, now in extensive use.

Also, since the storage battery 4 in the light charging type secondary battery unit 80 is substantially of the same outer shape and size as the pre-set battery standard shape, excepting the cut-out 4a at the positive electrode side corner thereof, the storage battery 4 can be mounted in or dismantled from the battery housing section of the ordinary electrical equipment employing the standard battery having the standard battery shape and size. Thus, the storage battery 4 can be extracted from the winding core 2 and housed in the battery housing section of the ordinary electrical equipment for use as a power source for the ordinary electrical equipment. Stated discriminatingly, the light charging type secondary battery unit 80 can be used as a charger for charging the storage battery 4.

There is no particular limitation to the shape of the battery controlling protrusion 14, it being only sufficient if it is formed in a manner of cutting out the standard battery having the pre-set shape and size of the standard battery. In the following, several embodiments in which the battery controlling protrusion 14 is of an alternative shape are explained with reference to FIG. 18. It is noted that, in FIG. 18, the shape of the standard battery is indicated by a broken line in order to clarify that the battery controlling protrusion 14 is protuberantly formed in a manner of cutting out the standard battery.

Figure 18A:
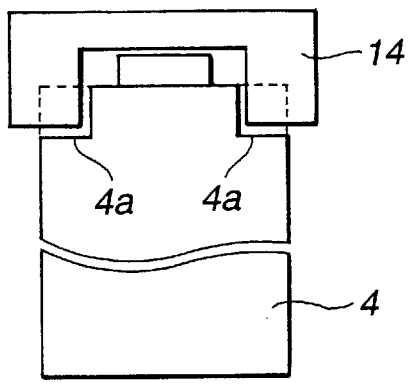
FIGS. 18A–D are an chematic view showing a, alternative form of the cell controlling projection of the secondary battery unit.
Figure 18B:
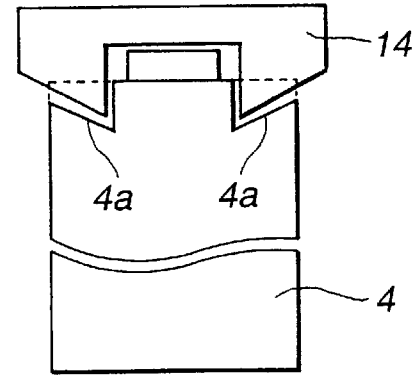
Figure 18C:
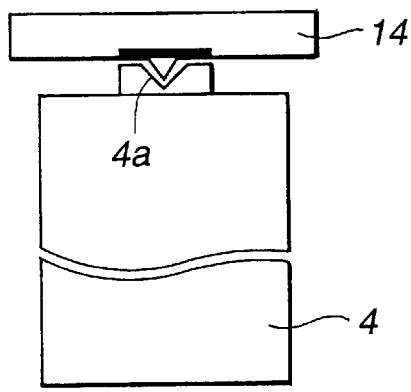
Figure 18D:
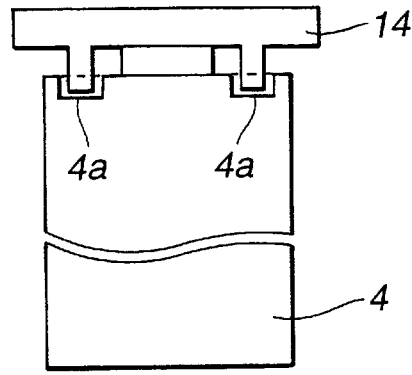

In a first embodiment, the battery controlling protrusion 14 is provided in a manner of cutting out the positive electrode side corner of the storage battery 4, as shown in FIG. 18a. In a second embodiment, the battery controlling protrusion 14 is provided in a manner of cutting out the storage battery 4 from the center towards the outer rim of the storage battery 4, so that the cutting depth will be progressively shallower from the center towards the outer rim of the storage battery 4, as shown in FIG. 18b. In a third embodiment, the battery controlling protrusion 14 is formed in a manner of cutting out the center portion of the positive electrode terminal of the storage battery 4, as shown in FIG. 18c. In a fourth embodiment, the battery controlling protrusion 14 is provided in a manner of concentrically cutting out a surface of the storage battery 4 provided with the positive electrode terminal of the storage battery 4, as shown in FIG. 18d.

In any of the above-described embodiments, the battery controlling protrusion 14 is protuberantly formed in a manner of partially cutting out the standard battery. The storage battery 4 is formed with the cut-out 4a configured for mating with the battery controlling protrusion 14 in the respective embodiments.

A light charging type secondary battery unit 50 was prepared in accordance with the preferred embodiment of the present invention and put to a test for measuring its charging characteristics. In this measurement test, the light charging type secondary battery unit 50 was manufactured to the same outer shape and size as those of the R6 type standard battery termed the tan-3 type.

In this measurement test, an amorphous silicon element, 45 mm in width and 300 mm in length, was used as the photo-electric transducer 3. This element has an output voltage of 3 V and an output current of 250 mA.

Also, in this measurement test, six SR527 type standard batteries, which are silver oxide zinc cell, were used as the secondary batteries 4 in a parallel connected state. In this case, the light charging type secondary battery unit 50 is of the capacity of 120 mAh to improve higher voltage stability.

With the above-described light charging type secondary battery unit 50, the charging state was controlled by the control circuit 5 so that the charging voltage will be 2.4 V and so that the voltage of each cell will not exceed 2.05V. By so doing, the charging of the charger 4 was completed on irradiating the direct sunlight to the photo-electric transducer 3 for three hours.

From this, it may be seen that the light charging type secondary battery unit according to the present invention exhibits a practically sufficient charging performance.

Figure 19:
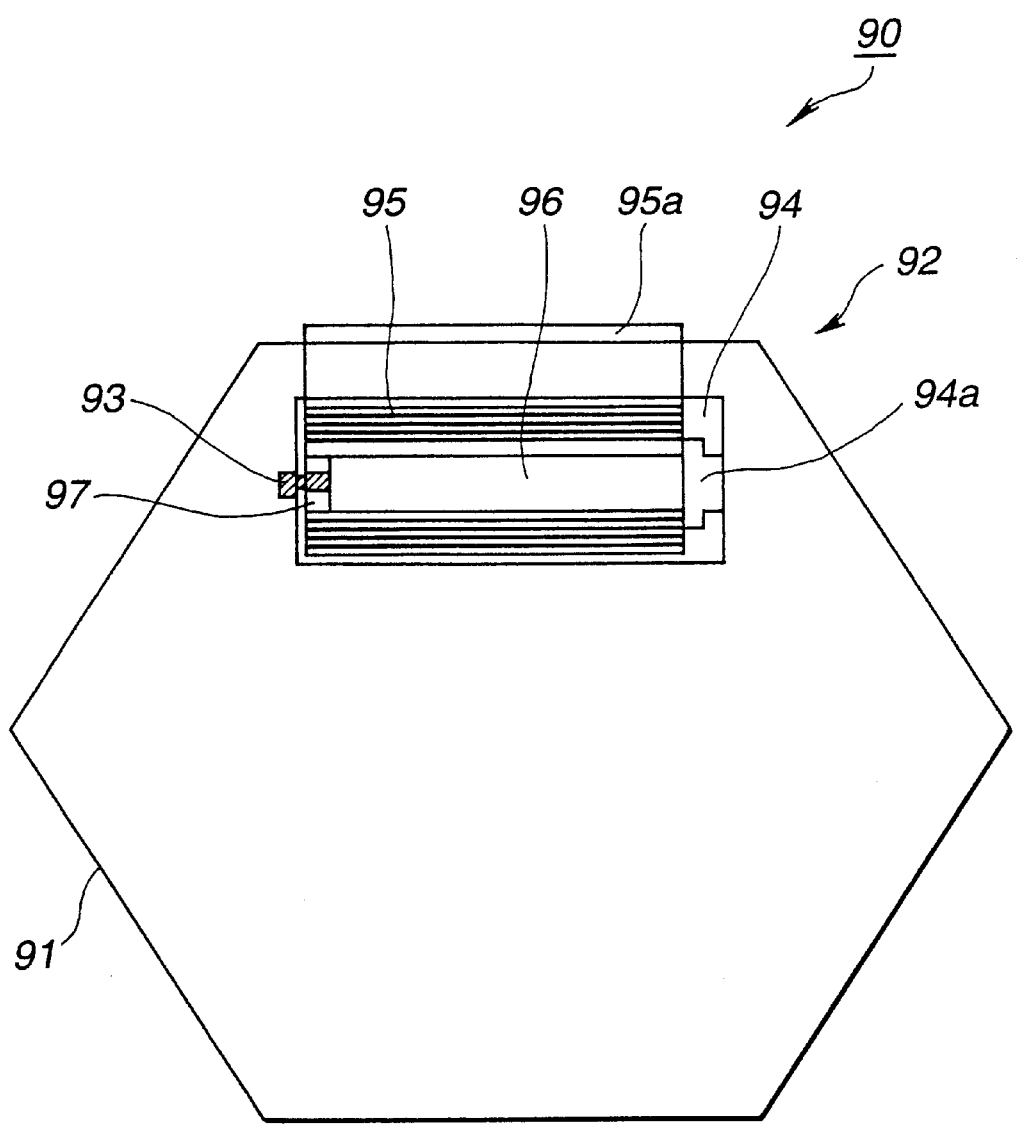
FIG. 19 is a schematic view showing an electrical equipment according to the present invention.
Figure 20:
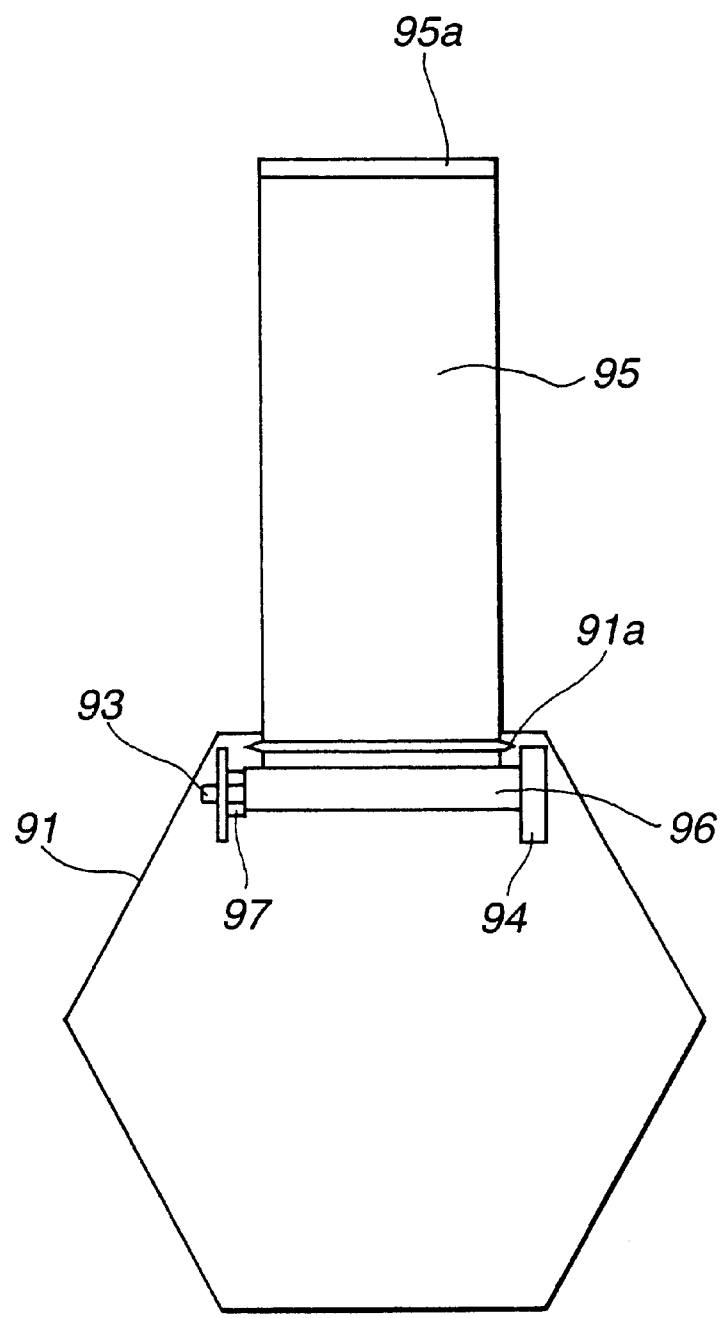
FIG. 20 is a schematic view showing an electrical equipment according to the present invention.

An electrical equipment according to the present invention is hereinafter explained. The following explanation is made of an electrical equipment 90 shown in FIGS. 19 and 20. Although a portable CD player is shown in FIGS. 19, 20 as illustrating the electrical equipment 90, the present invention is not limited to the portable CD player provided that the equipment is operated by an electric power. In the following explanation, the parts or components making up the portable CD player are not explained and only the parts or components pertinent to the gist of the present invention are explained.

The electrical equipment 90 is made up of an exterior member 91, an operating equipment portion, not shown, and a power source unit 92. The operating equipment portion and the power source unit 92 are arranged in the internal space of an exterior member 91.

The exterior member 91 is formed with a slit 91a in the vicinity of the power source unit 92. The slit 91a is of a width and a length slightly larger than a photo-electric transducer 95 as later explained. In the electrical equipment 90, the photo-electric transducer 95 may be extracted outwardly from the exterior member 91 via the slit 91a.

The operating equipment portion performs various operations by the electric power furnished from the power source unit 92. The electrical equipment 90, provided with the power source unit 92, may be configured so that its operating equipment portion can be run by the electric power supplied from a receptacle provided indoors by being used in conjunction with an AC/DC converter.

The power source unit 92 includes a positive terminal 93, a negative terminal 94, a photo-electric transducer 95, a storage battery 96 and a control circuit 97. The positive terminal 93 and the negative terminal 94 are electrically connected to the positive and negative terminals of the storage battery 96, respectively. In the electrical equipment 90, the electric power is supplied from the storage battery 96 to the operating equipment portion via the positive terminal 93 and the negative terminal 94 to run the operating equipment portion.

A portion of the negative terminal 94 is designed as a detachable lid 94a. The electrical equipment 90 is configured for taking out the storage battery 96 by removing the lid 94a. By so doing, if the storage battery 96 of the electrical equipment 90 is used up due to repeated charging/discharging, solely the storage battery 96 can be exchanged. Therefore, in the electrical equipment 90, it becomes unnecessary to discard the various operating portions of the electrical equipment 90 other than the storage battery 96, having the service life longer than that of the storage battery 96, along with the used-up storage battery 96, thus contributing effective utilization of natural resources.

The photo-electric transducer 95, so-called solar cell, is resilient and configured substantially as a rectangular sheet. Specifically, the photo-electric transducer 95, formed by an elastic thin film, is formed by sequentially layering a reflective electrode layer on an insulating film, such as a polyester film, a photo-electric transducing layer, formed by an amorphous thin semiconductor film, exemplified by an a-Si pnjunction structure, and a transparent electrode layer, mainly composed of metal oxides, such as SnO, $SnO_2$ or $In_2O_3$. The reflective electrode layer includes a metal electrode mainly composed of Ag, Al, Cr, Ni, Cu or C. These layers of the photo-electric transducer 95 are layered by the PVD method, exemplified by the sputtering method or the vapor deposition method, method, or by the CVD exemplified by a plasma CVD method or a MOCVD. The photo-electric transducer may be formed of, for example, a p-type organic semiconductor, such as perillene, and a n-type organic semiconductor, such as copper phthalocyanine and arranged as a pn-junction structure.

The photo-electric transducer 95 is housed in an inner spacing of the exterior member 91, by being wound about the storage battery 96, with an innermost end of the photo-electric transducer being secured. By so doing, the electrical equipment 90 can accommodate the photo-electric transducer 95 so that the inner spacing of the electrical equipment will be exploited efficiently. On an innermost rim side of the photo-electric transducer 95, a positive terminal and a negative terminal, not shown, are provided, and are electrically connected to a pre-set position in the control circuit 97 by wiring means, not shown.

An outermost rim of the photo-electric transducer 95 is pulled outwards via the slit 91a of the exterior member 91 and is provided with a retainer 95a. The retainer 95a is cylindrically shaped with a diameter slightly larger than the thickness of the slit 91a and has the function of preventing the photo-electric transducer 95 from being pulled completely into the inside of the exterior member 91. The retainer 95a also has the function of a handle used in pulling the photo-electric transducer 95 outwards.

The photo-electric transducer 95 is housed in the wound state in the inner spacing of the electrical equipment 90, as shown in FIG. 19, while it can be freely pulled out from the electrical equipment 90, as shown in FIG. 20. With the electrical equipment 90, the photo-electric transducer 95 is pulled out for receiving the light to furnish the electric power to the storage battery 96 for charging.

The storage battery 96 is a secondary battery that can be charged or discharged. For example, the storage battery 96 is a nickel-hydrogen secondary battery, a nickel-cadmium secondary battery, a nickel-zinc secondary battery or an iron-nickel battery.

The storage battery 96 is preferably a nickel-hydrogen secondary battery. In this case, the storage battery 96 can be improved in energy density per unit volume and is superior in adaptability to environment without employing heavy metals, such as lead or cadmium.

The control circuit 97 is provided in a superfluous spacing of the power source unit 92 and has the functions of rectifying the photo-electric transducer 95 and the storage battery 96, preventing overcharging of the storage battery 96 by the photo-electric transducer 95 and preventing over-discharging of the storage battery 96. The control circuit 97 is configured similarly to the control circuit 5 in the light charging type secondary battery unit 1.

In the light charging type secondary battery unit 90, constructed as described above, the photo-electric transducer 95 is pulled outwards from the slit 91a of the exterior member 91 to receive the light, as shown in FIG. 20. This photo-electric transducer 95 converts the light energy, such as the sunlight, into the electric energy. The photo-electric transducer 95 furnishes this electric energy to the storage battery 96 to charge the storage battery 96.

Since the photo-electric transducer 95 of the electrical equipment 90 can be increased in its light receiving area, it is possible to increase the power output of the photo-electric transducer 95. Thus, the charging time for the storage battery 96 for the electrical equipment 90 can be shortened to a practically sufficiently low level. Also, since the photo-electric transducer 95 is housed in the wound state in the internal spacing of the electrical equipment 90, as shown in FIG. 19, the spacing occupied by the housed photo-electric transducer 95 can be diminished despite increased area of the photo-electric transducer 95.

In the electrical equipment 90, the power generated by the photo-electric transducer 95 is transiently stored in the storage battery 96 and, when the operating equipment portion is run in operation, the power is furnished from the storage battery 96 to the operating equipment portion. This enables the operating equipment portion of the electrical equipment 90 to utilize a larger quantity of the electric power than if the power is directly furnished from the photo-electric transducer 95. Also, the operating equipment portion of the electrical equipment 90 can be run in operation by the electric power furnished from the storage battery 96 even in places or situations wherein it is difficult to cause the photo-electric transducer 95 to receive a sufficient quantity of the light energy.

Figure 21:
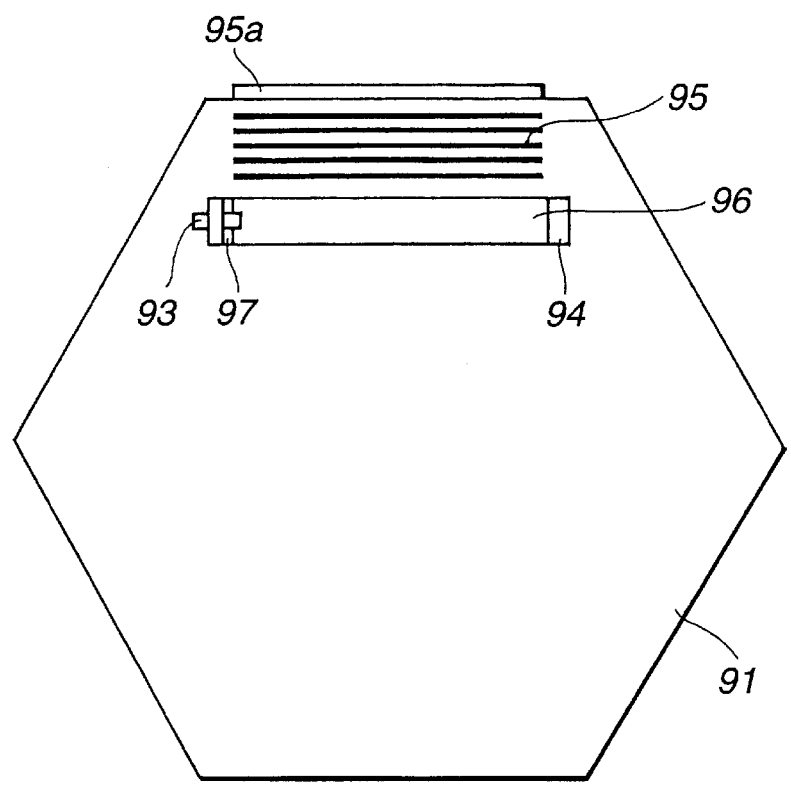
FIG. 21 is a schematic view showing another electrical equipment according to the present invention.
Figure 22:
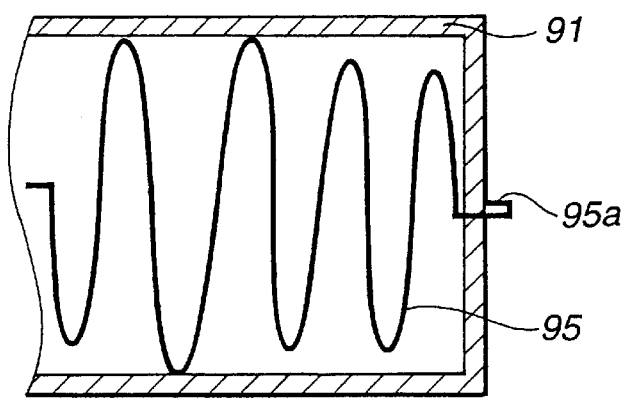
FIG. 22 is a cross-sectional view showing essential portions of the electrical equipment shown in FIG. 21.

In the electrical equipment 90, the photo-electric transducer 95 is housed in a state in which it is placed around the storage battery 96. However, this structure is given merely for illustration. The photo-electric transducer 95 may also be housed in the electrical equipment 90 in a state in which it is wound around a member other than the storage battery 96. The photo-electric transducer 96 may also be housed in a bellows-like state in the inner spacing of the electrical equipment 90, as shown in FIGS. 21 and 22. It is possible with the electrical equipment 90 to accommodate the photo-electric transducer 95 efficiently even if the photo-electric transducer 95 is housed in this collapsed state.

What is claimed is:

1. A light charging type secondary battery unit comprising:
   a cylindrically-shaped winding core, and
   a flexible photo-electric transducer placed around said winding core so that the photo-electric transducer can be pulled out therefrom;
   said winding core including a secondary battery that can be charged and discharged, an a control circuit for controlling the charging and discharging of the secondary battery;
   said photo-electric transducer being wound on said winding core to present a substantially cylindrical overall shape.

2. The light charging type secondary battery unit according to claim 1 wherein said photo-electric transducer being wound on said winding core to present a pre-set cylindrical standard battery shape.

3. The light charging type secondary battery unit according to claim 1 wherein the discharge voltage ranges from 0.6 to 1.9 V.

4. The light charging type secondary battery unit according to claim 1 wherein the battery unit comprises a nickel-hydrogen secondary battery.

5. The light charging type secondary battery unit according to claim 1 wherein the battery unit comprises a standard storage battery having a pre-set standard battery shape.

6. The light charging type secondary battery unit according to claim 1 wherein the secondary battery can be mounted on or dismantled from the winding core.

7. The light charging type secondary battery unit according to claim 6 wherein
a protrusion for prohibiting loading of a standard battery having a pre-set standard battery shape is provided in a housing space of said winding core adapted for housing said secondary battery; and wherein
the storage battery is of an outer shape substantially similar to that of the pre-set standard battery and has a recess in which to fit said protrusion.

8. The light charging type secondary battery unit according to claim 1 wherein
said photo-electric transducer is wound on said winding core in a state in which the photo-electric transducer is collapsed in a direction perpendicular to the pulling-out direction of the photo-electric transducer from the winding core, said photo-electric transducer being spread out as it is pulled out from the winding core.

9. The light charging type secondary battery unit according to claim 1 wherein said winding core is formed as-one with an upper flange and an lower flange at both ends thereof, said upper and lower flanges being substantially flat-plate-shaped.

10. The light charging type secondary battery unit according to claim 9 further comprising:
a cylindrically-shaped outer peripheral wall for covering said photo-electric transducer wound on said winding core, said outer peripheral wall having a pull-out opening as a pull-out opening for said winding core;
said upper and lower flanges having grooves in which the lateral edge of said outer peripheral wall is fitted to permit rotation of said outer peripheral wall;
the photo-electric transducer in the pulled-out state being taken up into the inner spacing constructed by the winding core and the outer peripheral wall by rotating said outer peripheral wall.

11. An electrical equipment comprising:
a secondary battery that can be charged and discharged and a flexible photo-electric transducer;
said photo-electric transducer being housed in an inner space of said electrical equipment in a wound or a collapsed state and being extracted from said inner space of said electrical equipment in an unwound or a un-collapsed state; said secondary battery being charged when said photo-electric transducer is extracted from said electrical equipment.

12. The electrical equipment according to claim 11 wherein said photo-electric transducer is housed in a state in which it is wound about said secondary battery.

* * * * *